Patented Oct. 7, 1930

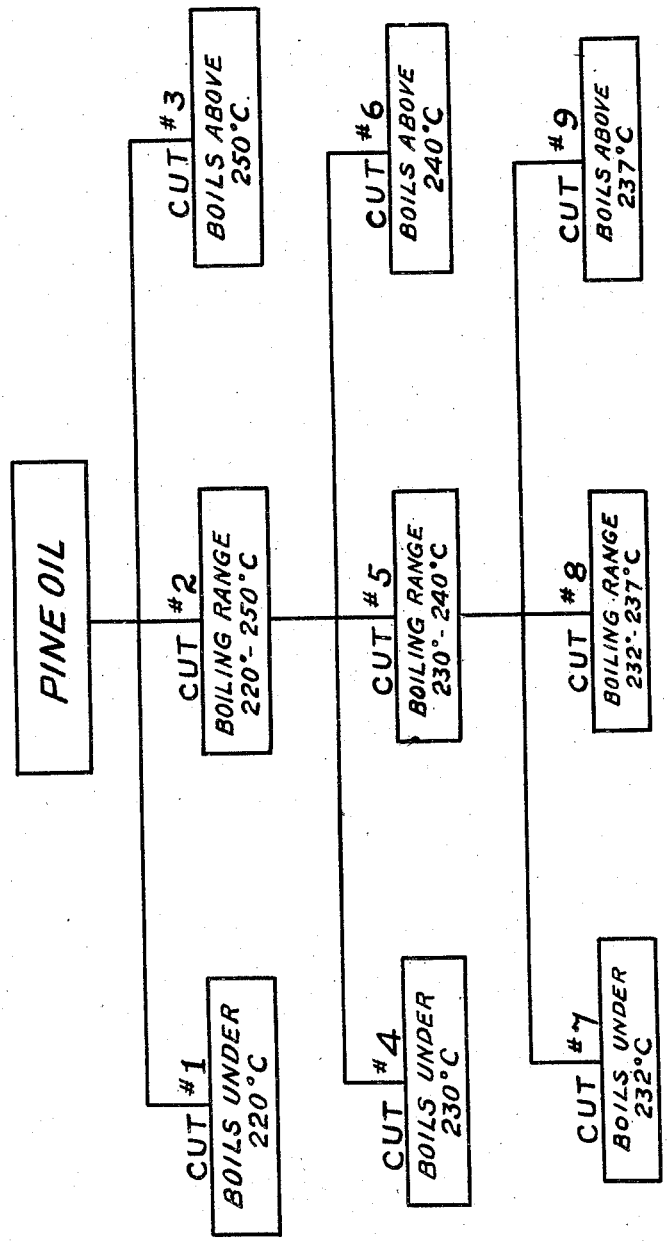

1,777,704

UNITED STATES PATENT OFFICE

LEE T. SMITH, OF KENVIL, NEW JERSEY, ASSIGNOR TO HERCULES POWDER COMPANY, OF WILMINGTON, DELAWARE, A CORPORATION OF DELAWARE

METHOD OF SEPARATING ANETHOL FROM PINE OIL

Application filed August 11, 1927. Serial No. 212,302.

My invention relates to a method of separating anethol from pine oil.

Anethol, which has a boiling point of about 235° C. has heretofore been recognized as a constituent of oil of anise and has been derived from anise seed, being used principally as a flavoring. However, anethol has not heretofore been recognized as a constituent of pine oil.

According to my invention I have discovered that anethol is present in pine oil and my invention has for its object the provision of a method for effecting the separation of anethol from pine oil.

According to the method embodying my invention, pine oil is fractionated and cuts having a boiling range below about 220° C. and between about 220° C.-250° C. and above about 250° C., respectively, are obtained. The cut boiling between 220° C.-250° C. contains the major proportion of the anethol present in the original pine oil.

The cut after treatment is refractionated up to about 250° C. and the distillate refrigerated. The refrigeration of the distillate will result in effecting crystallization of the anethol, which may be readily separated from the mother liquor by filtration or centrifugation.

In the carrying out of the process embodying my invention, the cut having about the boiling range indicated may be refractionated up to 250° C., the distillate obtained being cooled to effect crystallization of anethol, which may then be recovered by filtration or centrifugation. Where the cut of higher boiling range is substantially rich in anethol, the distillate obtained on refractionation of this cut may be cooled to effect the crystallization of anethol and then filtered, or centrifuged, for the separation of anethol. The filtrate thus obtained and the residue from the refractionation of the cut of higher boiling range may be mixed with the filtrate obtained from the refractionation of the cut of lower boiling point and the mixture refractionated up to 240° C. The distillate obtained is then cooled to effect separation of the anethol, which is separated by filtration, or centrifugation.

As an example of the carrying out of the process embodying my invention and with reference to the accompanying drawing in which is shown a flow sheet, the pine oil is first fractionated into three cuts numbered on the accompanying drawing 1, 2 and 3. Cuts #1 and #3 are set aside and cut #2 is refractionated into cuts numbered on the accompanying drawing 4, 5 and 6. Cuts #4 and #6 are set aside. Cut #5 is treated to effect the crystallization therefrom of anethol. The crystallization of anethol from cut #5 may be effected by refrigerating and seeding with a crystal preferably of anethol, or by refrigerating and inducing crystallization by mechanical means, as by adding a small piece of glass, a grain of sand or a crystal, for example, of salt.

After the anethol is crystallized, it is separated from the mother liquor by, for example, filtration or centrifugation. The mother liquor is then refractionated into cuts numbered on the accompanying drawing 7, 8 and 9. Cuts #7 and #9 are set aside and cut #8 is treated to effect crystallization therefrom of anethol, which after crystallization may be readily separated by filtration or centrifugation. After the separation of the crystallized anethol from cut #8, the mother liquor may be refrigerated as indicated and further quantities of anethol recovered.

The process embodying my invention may be carried out in any suitable apparatus and the fractionations may be effected with or without steam and under atmospheric or reduced pressure, as desired. Fractionation under reduced pressure is preferable since a lower temperature may be used with less decomposition and polymerization and with the production of products of better odor and of probably greater purity.

In effecting the crystallization of anethol such may be accomplished by refrigeration or by refrigerating or cooling and seeding with a crystal, preferably a crystal of anethol, or inducing crystallization by mechanical means, as by adding a small piece of glass, a grain of sand or the like.

It will be understood that the carrying out of my invention as described herein specifically with reference to the accompanying drawing is by way of example only and shall not be taken as limiting my invention in its broader aspect.

Having now fully described my invention, what I claim and desire to protect by Letters Patent is:—

1. The method of separating anethol from pine oil which includes fractionating pine oil to obtain a cut boiling within about the range 230° C.–240° C. and effecting crystallization of anethol as such therefrom.

2. The method of separating anethol from pine oil which includes fractionating pine oil to obtain a cut sufficiently rich in anethol and which will boil at normal atmospheric pressure largely within about the range 220° C.–250° C., fractionating the cut to obtain a fraction boiling at normal atmospheric pressure largely within about the range 230° C.–240° C., and effecting crystallization of anethol from said fraction.

3. The method of separating anethol from pine oil which includes fractionating pine oil to obtain a cut sufficiently rich in anethol and which will boil at normal atmospheric pressure largely within about the range 220° C.–250° C., fractionating the cut to obtain a fraction boiling at normal atmospheric pressure largely within about the range 230° C.–240° C., and cooling the cut to effect crystallization of anethol therefrom.

4. The method of separating anethol from pine oil which includes fractionating pine oil to obtain a cut sufficiently rich in anethol and which will boil at normal atmospheric pressure largely within about the range 220° C.–250° C., fractionating the cut to obtain a fraction boiling at normal atmospheric pressure largely within about the range 230° C.–240° C., and cooling and seeding the cut to effect crystallization of anethol therefrom.

5. The method of separating anethol from pine oil which includes fractionating pine oil to obtain a cut sufficiently rich in anethol and which will boil at normal atmospheric pressure largely within about the range 220° C.–250° C., refractionating the cut to obtain a cut boiling at normal atmospheric pressure largely within about the range 232° C.–237° C., and cooling and seeding the cut to effect crystallization of anethol therefrom.

In testimony of which invention, I have hereunto set my hand, at Kenvil, New Jersey, on this 1st day of August, 1927.

LEE T. SMITH.